(12) United States Patent
Ohmura et al.

(10) Patent No.: US 8,388,238 B2
(45) Date of Patent: Mar. 5, 2013

(54) FERRULE, AND METHOD OF PRODUCING AN OPTICAL WAVEGUIDE CONNECTOR, AND OPTICAL WAVEGUIDE CONNECTOR WHICH USE THE FERRULE

(75) Inventors: Masaki Ohmura, Kanagawa (JP); Mitsuaki Tamura, Kanagawa (JP); Hikaru Kouta, Tokyo (JP); Kaichiro Nakano, Tokyo (JP); Hideyuki Ono, Tokyo (JP); Chiemi Tanaka, Tokyo (JP)

(73) Assignees: Sumitomo Electric Industries, Ltd., Osaka (JP); NEC Corporation, Tokyo (JP)

( * ) Notice: Subject to any disclaimer, the term of this patent is extended or adjusted under 35 U.S.C. 154(b) by 110 days.

(21) Appl. No.: 12/443,339

(22) PCT Filed: Oct. 5, 2007

(86) PCT No.: PCT/JP2007/069608
§ 371 (c)(1),
(2), (4) Date: Mar. 27, 2009

(87) PCT Pub. No.: WO2008/044654
PCT Pub. Date: Apr. 17, 2008

(65) Prior Publication Data
US 2010/0014815 A1   Jan. 21, 2010

(30) Foreign Application Priority Data
Oct. 11, 2006 (JP) .............................. P. 2006-277893

(51) Int. Cl.
*G02B 6/36* (2006.01)
(52) U.S. Cl. .......................................... 385/83; 385/65

(58) Field of Classification Search .............. 385/60–69, 385/72, 83, 78; 264/1.24, 1.25
See application file for complete search history.

(56) References Cited

U.S. PATENT DOCUMENTS
(Continued)

FOREIGN PATENT DOCUMENTS
| JP | 4-216505 | 8/1992 |
| JP | 08-190031 A | 7/1996 |

(Continued)

OTHER PUBLICATIONS

Japanese Office Action, and English translation thereof, issued in Japanese Patent Application No. 2006-277893 dated May 15, 2012.
Japanese Office Action, and English translation thereof, issued in Japanese Patent Application No. 2006-277893 dated Oct. 2, 2012.

*Primary Examiner* — Uyen Chau N Le
*Assistant Examiner* — Michael Mooney
(74) *Attorney, Agent, or Firm* — McDermott Will & Emery LLP

(57) ABSTRACT

A method of producing an optical waveguide connector in which the productivity of a ferrule member can be improved, and the connection loss with a counter connector can be suppressed to a low level is obtained.
An optical waveguide connector 11 is obtained by performing: an aligning step of restricting the position of the tip end of an optical waveguide 2 passed through an insertion hole 13*b* of a ferrule member 13, by a positioning portion of a positioning member 16 which is oppposedly placed at the tip end of the ferrule member 13, thereby aligning the optical waveguide 2 to the ferrule member 13; and a bonding step of filing a gap between the optical waveguide 2 which is passed through the insertion hole 13*b*, and the insertion hole 13*b*, with an adhesive agent to fix the optical waveguide 2 to the ferrule member 13.

11 Claims, 4 Drawing Sheets

U.S. PATENT DOCUMENTS

| | | |
|---|---|---|
| 6,409,394 B1 * | 6/2002 | Ueda et al. ............... 385/80 |
| 6,439,780 B1 * | 8/2002 | Mudd et al. ............... 385/83 |
| 6,798,950 B2 * | 9/2004 | Chao et al. ............... 385/34 |
| 7,008,118 B2 * | 3/2006 | Yoshitani et al. ............... 385/78 |
| 2003/0190135 A1 * | 10/2003 | Moidu et al. ............... 385/138 |
| 2009/0154884 A1 * | 6/2009 | Chen et al. ............... 385/79 |

FOREIGN PATENT DOCUMENTS

| | | |
|---|---|---|
| JP | 9-015444 | 1/1997 |
| JP | 2000-002820 | 1/2000 |
| JP | 2006-184819 | 7/2006 |

* cited by examiner

FIG. 3 (a)
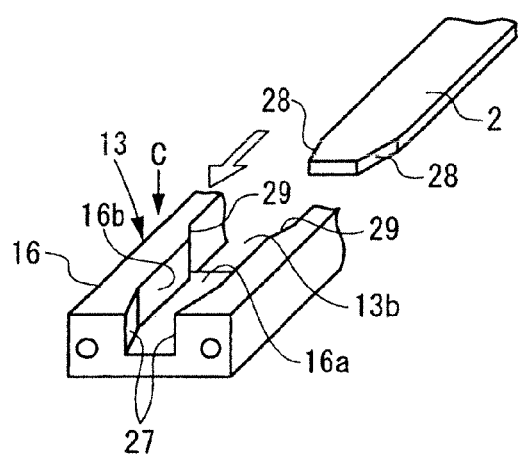
FIG. 3 (b)
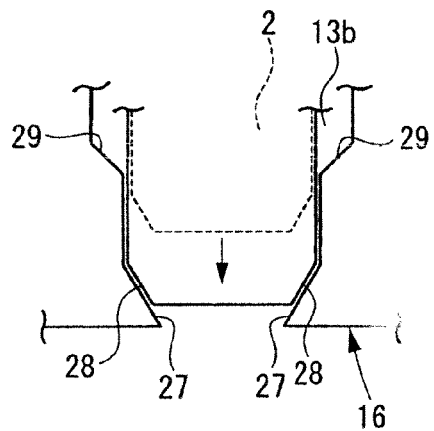
FIG. 4 (a) Prior Art
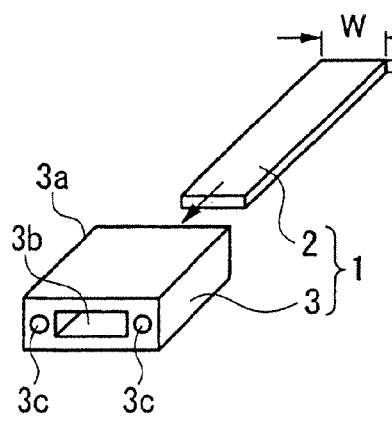
FIG. 4 (b) Prior Art
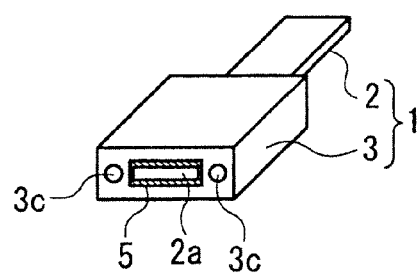

FERRULE, AND METHOD OF PRODUCING AN OPTICAL WAVEGUIDE CONNECTOR, AND OPTICAL WAVEGUIDE CONNECTOR WHICH USE THE FERRULE

RELATED APPLICATIONS

This application is the U.S. National Phase under 35 U.S.C. §371 of International Application No. PCT/JP2007/069608, filed on Oct. 5, 2007, which in turn claims the benefit of Japanese Application No. 2006-277893, filed on Oct. 11, 2006, the disclosures of which Applications are incorporated by reference herein.

TECHNICAL FIELD

The present invention relates to a ferrule which is used in the case where an optical waveguide is housed to be connector-connected to another optical component, and a method of producing an optical waveguide connector, and optical waveguide connector which use the ferrule.

BACKGROUND ART

As an optical waveguide connector which is used in the case where an optical waveguide such as an optical fiber ribbon or a polymer waveguide is connector-connected to another optical component, the configuration shown in FIG. 4 is known.

In the optical waveguide connector 1 shown in the figure, a tip end portion of a planar optical waveguide 2 is housed and held in a ferrule 3.

In the ferrule 3, as shown in FIG. 4(a), an insertion hole 3b through which the optical waveguide 2 is to be passed is penetratingly formed in the body 3a having a substantially rectangular parallelepiped shape. A pair of positioning holes 3c into which positioning pins for positioning with respect to a counter connector component (for example, an MT connector) are to be press inserted are formed in the body 3a in which the insertion hole 3b is opened.

After an adhesive agent 5 is filled into a gap between the insertion hole 3b and the optical waveguide 2 inserted into the insertion hole 3b of the ferrule 3, and the optical waveguide is fixed to the ferrule 3 by curing of the adhesive agent 5, the tip end face 2a of the optical waveguide is polished.

As a method of producing the ferrule 3, conventionally, a production method in which a ferrule is produced by injection molding of a resin material has been widely used. In this case, the insertion hole 3b and the positioning holes 3c are formed by combining a core for producing the insertion hole 3b and the positioning holes 3c with upper and lower dies for forming the outer shell of the body 3a.

In the case of the optical waveguide connector 1 having the above-described structure, in order to suppress the connection loss with the counter connector to a low level, it is necessary to reduce the axial misalignment between an optical fiber of the counter connector and the optical waveguide 2 in the optical waveguide connector 1 as far as possible. In order to realize this, in addition to reduction of the positional misalignment (axial misalignment) between the connector center defined by the pair of positioning holes 3c and the center of the insertion hole 3b, it is essential to accurately form the insertion hole 3b in accordance with the outer diameter dimension of the optical waveguide 2.

In the case where the above-mentioned polymer waveguide is used as the optical waveguide 2, when the connection loss with the counter connector is to be suppressed to a low level of, for example, 0.3 dB or less, it is essential to accurately form the insertion hole 3b so that the clearance between the insertion hole 3b and the optical waveguide 2 is several μm or less.

In the outer diameter dimension of a polymer waveguide, usually, the width dimension w is about 3 to 5 mm, and the thickness dimension t is about 100 μm. The outer diameter dimension is very smaller than that of a conventional optical fiber ribbon.

Therefore, the core which is used for molding the insertion hole 3b in molding dies for the ferrule 3 is formed as a thin piece having a thickness of about 100 μm, and hence easily deformed. In production of the ferrule 3, consequently, there arise problems such as that the yield is lowered because of a mold failure.

In order to prevent such problems from arising, an optical waveguide connector 6 shown in FIG. 5 has been proposed.

In the optical waveguide connector 6, a ferrule 7 which houses and holds a tip end portion of the optical waveguide 2, and which is to be connected to a counter connector has a structure where it is split into vertical halves. Therefore, an upper body 7a and lower body 7b constituting the ferrule 7 have a configuration where an insertion groove 8 constituting an insertion hole through which the optical waveguide 2 is to be passed, and positioning grooves 9 constituting a pair of positioning holes are formed in each butting face (for example, see Patent Reference 1).

According to this structure, during injection molding of the upper body 7a and lower body 7b constituting the ferrule 7, the grooves which will constitute the insertion hole and the positioning holes are exposed from the outer face. Therefore, it is not required to combine a core configured by a thin piece, with the molding dies, and hence molding with a high yield can be realized.

Patent Reference 1: Japanese Patent Publication: JP-A-2000-2820

DISCLOSURE OF THE INVENTION

Problems that the Invention is to Solve

In the case of the optical waveguide connector 6 using the ferrule 7 which is split into halves as described above, however, an assembling step of bonding and integrating together the upper body 7a and the lower body 7b is required in production, thereby causing a problem in that the productivity of the optical waveguide connector is hardly improved because of the step of assembling the ferrule 7.

In the assembling step of bonding and integrating together the upper body 7a and the lower body 7b, an error in the accuracy of the bonding between the upper body 7a and the lower body 7b may cause errors in the dimension accuracies of the insertion and positioning holes to be larger than a reference, thereby producing the possibility that the connection loss is increased.

It is an object of the invention to provide a ferrule in which a core configured by a thin piece is not required to be combined with molding dies that are used in injection molding, and the productivity can be improved by enhancement of the yield in production, and also to provide a method of producing an optical waveguide connector, and optical waveguide connector which use such a ferrule, and in which therefore accurate positioning of an optical waveguide can be stably realized, and the connection loss due to axial misalignment can be suppressed to a low level.

Means for Solving the Problems

In order to attain the object, the ferrule according to claim 1 of the invention is a ferrule in which an insertion hole into which an optical waveguide is to be passed is penetratingly formed, wherein a positioning portion which positions the optical waveguide to an axial center of the insertion hole is formed integrally with a tip end of the ferrule.

The ferrule according to claim 2 of the invention is characterized in that, in the ferrule according to claim 1, a clearance between the optical waveguide which is passed through the insertion hole, and the insertion hole is larger than a clearance between the positioning portion and the optical waveguide.

The ferrule according to claim 3 of the invention is characterized in that, in the ferrule according to claim 1, the optical waveguide is formed to have a substantially rectangular section shape, and the positioning portion includes a rectangular groove having a rectangular section shape which substantially coincides with the optical waveguide.

The ferrule according to claim 4 of the invention is characterized in that, in the ferrule according to claim 3, inclined faces which, in a width direction, restrict a position of the optical waveguide on a bottom face of the groove are formed on both sides of the rectangular groove, respectively.

The method of producing an optical waveguide connector according to claim 5 of the invention is a method of producing an optical waveguide connector in which a ferrule according to claim 1 is used, and the optical waveguide is housed in the insertion hole of the ferrule, wherein the method comprises:

an aligning step of restricting the position of the optical waveguide passed through the insertion hole, by the positioning portion of the ferrule tip end, to position the optical waveguide to the axial center of the insertion hole; a bonding step of filing a gap between the insertion hole and the optical waveguide which is aligned with the insertion hole, with an adhesive agent; and a cutting step of cutting off the ferrule tip end including the positioning portion in a state where the optical waveguide is fixed to the insertion hole by the bonding step.

The optical waveguide connector according to claim 6 of the invention is characterized in that the connector is produced by a method of producing an optical waveguide connector according to claim 5.

Effects of the Invention

The optical waveguide which is passed through the insertion hole of the ferrule is positioned to the axial center of the insertion hole by the positioning portion which is formed integrally with the ferrule tip end. Even when the dimensional tolerance of the insertion hole itself of the ferrule is relaxed and the dimensions are set so as to leave a relatively large clearance in the periphery of the optical waveguide, therefore, the axial misalignment between the ferrule and the optical waveguide does not occur.

Since the ferrule has a single-piece structure, the ferrule itself does not require an assembling step such as bonding as compared with a convention ferrule having a two-split structure. Therefore, the productivity can be improved by the synergy of reduction of the number of production steps and the above-mentioned enhancement of the yield.

When the positioning portion is once accurately formed, the optical waveguide which is passed through the insertion hole of the ferrule can be easily and surely positioned to the axial center of the insertion hole, and the axial misalignment is prevented from occurring, whereby an optical waveguide connector in which the connection loss due to the axial misalignment is suppressed to a low level can be obtained.

In the ferrule, moreover, the positioning portion is integrally formed. Therefore, it is possible to omit the assembling step in the case where the conventional method is performed while a positioning member which is formed separately from the ferrule body is maintained to a predetermined positional relationship with the ferrule body by using the positioning pins.

BRIEF DESCRIPTION OF THE DRAWINGS

FIG. 3 is a view showing a second embodiment of the method of producing an optical waveguide connector according to the invention, in which (a) is a perspective view showing main portions of the optical waveguide connector, and (b) is a view looking in the direction of C in (a).

FIG. 4 is a perspective view showing a conventional method of producing an optical waveguide connector, in which (a) is a perspective view of a state before an optical waveguide is passed into a ferrule member, and (b) is a perspective view of a state where the optical waveguide is bonded and fixed by an adhesive agent.

DESCRIPTION OF REFERENCE NUMERALS AND SIGNS

Figure 1:
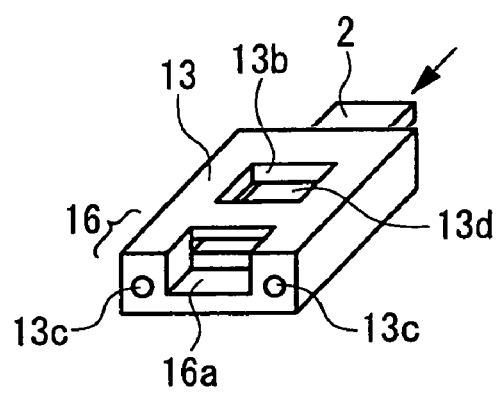
FIG. 1 is a perspective view of a first embodiment of the method of producing an optical waveguide connector according to the invention, in which (a) is a perspective view of a state where an optical waveguide is passed through a ferrule, (b) is a perspective view of a state where the optical waveguide is positioned by a positioning portion, (c) is a perspective view of a state where the optical waveguide is bonded and fixed to the ferrule, and (d) is a perspective view of a state where the positioning portion is cut off from the ferrule and the optical waveguide connector is completed.
Figure 1:
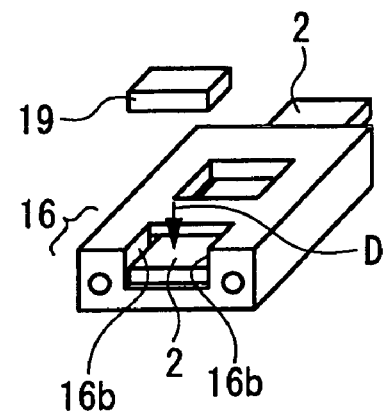
Figure 1:
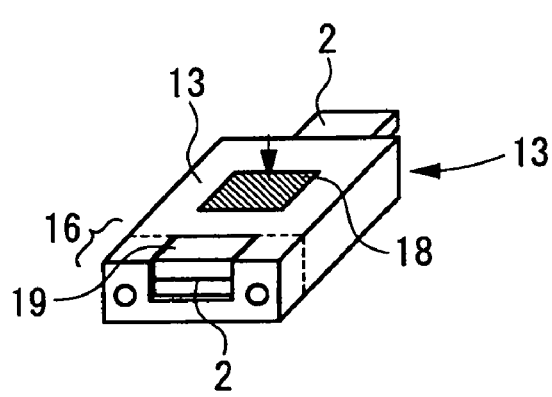
Figure 1:
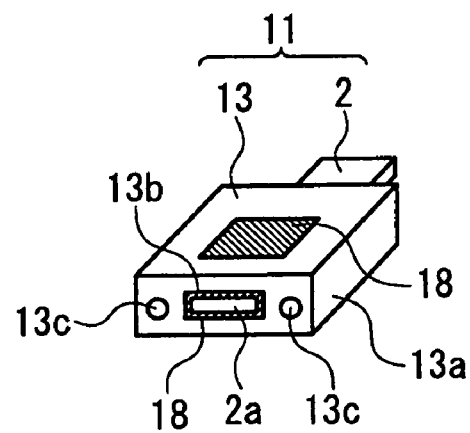

2 . . . optical waveguide
11 . . . optical waveguide connector
13 . . . ferrule
13b . . . insertion hole
13c . . . positioning hole
13d . . . opening
16 . . . positioning portion
16a . . . rectangular groove
16b . . . right and left wall faces
16c . . . positioning hole
18 . . . adhesive agent
27 . . . inclined face 28 ... chamfered portion
29 ... guide face

BEST MODE FOR CARRYING OUT THE INVENTION

Hereinafter, preferred embodiments of the ferrule of the invention, and a method of producing an optical waveguide connector, and optical waveguide connector which use the ferrule will be described in detail with reference to the drawings.

The term "optical waveguide" in the specification includes planar light transmitting means having various sectional rectangles, such as an optical waveguide, a polymer waveguide, and an optical fiber ribbon. In the embodiments, the case where a polymer waveguide is applied to an optical transmission path will be described.

FIG. 1 is a perspective view illustrating a first embodiment of the ferrule of the invention, and the method of producing an optical waveguide connector according to the invention which uses the ferrule. In the figure, (a) shows a state where an optical waveguide is passed through an insertion hole of the ferrule, (b) shows a state where the optical waveguide is positioned by a positioning portion at the tip end of the ferrule, (c) shows a state where the optical waveguide is bonded and fixed to the ferrule by filling of an adhesive agent, and (d) shows a state where the positioning portion is cut off from the ferrule tip end and the optical waveguide connector is completed.

Figure 2:
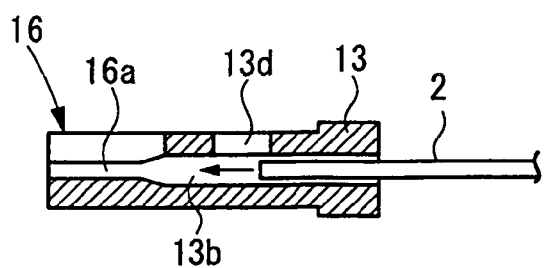
FIG. 2 is a diagram of production steps of the method of producing an optical waveguide connector shown in FIG. 1, in which (a) is a longitudinal section view showing an intermediate process of insertion of the optical waveguide into the ferrule, (b) is a longitudinal section view showing an aligning step of positioning the optical waveguide by the positioning portion, (c) is a longitudinal section view showing a bonding step of bonding and fixing the optical waveguide by an adhesive agent, (d) is a longitudinal section view showing a step of cutting off an extra portion in accordance with the tip end face of the ferrule, and (e) is a longitudinal section view of the completed optical waveguide connector.
Figure 2:
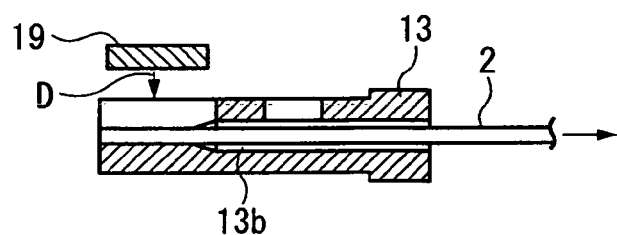
Figure 2:
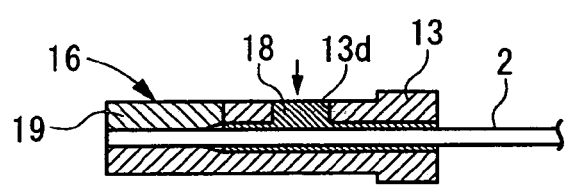
Figure 2:
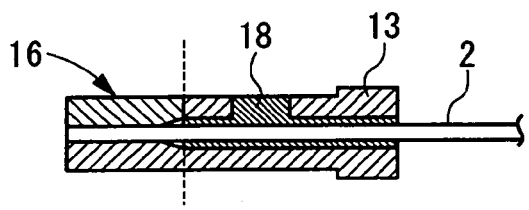
Figure 2:
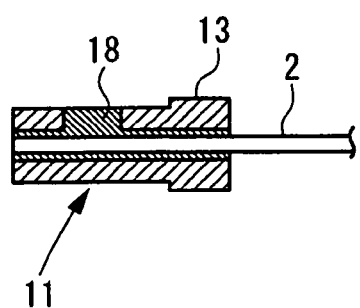
Figure 5:
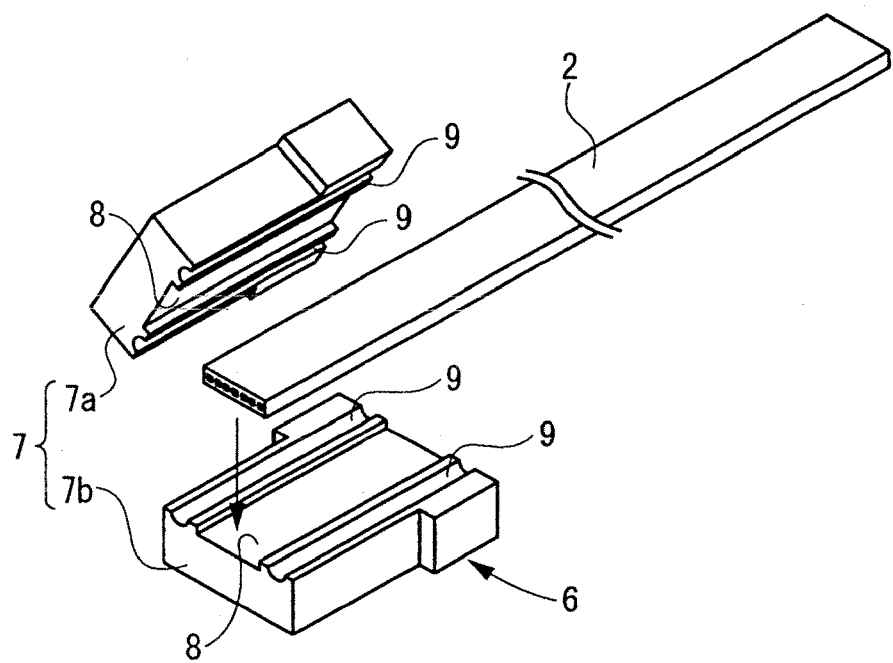
FIG. 5 is a perspective view of another conventional optical waveguide connector.

FIG. 2 is a diagram of production steps of the method of producing the optical waveguide connector shown in FIG. 1, in which (a) is a longitudinal section view showing an intermediate process of a step of inserting the optical waveguide into the insertion hole of the ferrule, (b) is a longitudinal section view showing an aligning step of restricting the position of the optical waveguide passed through the insertion hole of the ferrule, by the positioning portion to position the optical waveguide to the axial center of the insertion hole, (c) is a longitudinal section view showing a bonding step of filling a gap between the optical waveguide and the insertion hole while pressing the upper face of the optical waveguide which has been subjected to the aligning step, and which is in the positioning portion, by a pressing member to perform positioning in the thickness direction of the optical waveguide, (d) is a longitudinal section view showing a cutting step of, after the bonding step, cutting off an extra portion of the ferrule tip end including the positioning portion by dicing, and removing away the portion, and (e) is a longitudinal section view of the completed optical waveguide connector.

In the optical waveguide connector 11 which is to be formed by the method of producing an optical waveguide connector of the first embodiment, a tip end portion of the planar optical waveguide 2 is housed and held in the ferrule 13.

As shown in FIG. 1(a), the ferrule 13 is formed into a substantially rectangular parallelepiped shape, and the insertion hole 13b through which the optical waveguide 2 is to be passed, and which has a rectangular section shape is penetratingly formed in the anteroposterior direction.

In the ferrule 13, a pair of positioning holes 13c into which positioning pins that are not shown are to be press inserted are formed in parallel with the insertion hole 13b including the positioning portion 16 which will be described later.

The positioning pins which are to be press inserted into the positioning holes 13c, and which are not shown are used for positioning the completed optical waveguide connector 11 shown in FIG. 1(d), to a counter connector component (for example, an MT connector).

In the upper face of the ferrule 13, an opening 13d for filling the insertion hole 13b with the adhesive agent is disposed continuously to the insertion hole 13b.

In the ferrule 13 of the embodiment, in order to position the optical waveguide 2 to the axial center of the insertion hole 13b, the positioning portion 16 which communicates with the insertion hole 13b, and which is opened in the outer surface of the ferrule is integrally formed in the tip end of the ferrule.

In the embodiment, the positioning portion 16 includes a rectangular groove 16a which is formed into a rectangular section shape that substantially coincides with the optical waveguide 2, and in which two faces are opened. The optical waveguide 2 which is guided into the groove is positioned in the width direction by the right and left wall faces 16b of the rectangular groove 16a. At the same time, the positioning portion includes the pressing member 19 which, as indicated by the arrow D in FIG. 1(b), is lowered from the upper side of the groove 16a to be fitted into the groove 16a, and the pressing member 19 presses the upper face of the optical waveguide 2 which is guided into the groove, toward the groove bottom face, thereby positioning the optical waveguide 2 in the thickness direction of the optical waveguide 2. The optical waveguide 2 can be positioned the axial center of the insertion hole 13b by the rectangular groove 16a.

As described above, both of the insertion hole 13b of the ferrule 13 and the rectangular groove 16a of the positioning portion 16 are formed to have a rectangular section shape through which the optical waveguide 2 is to be passed. In the rectangular groove 16a, moreover, the width dimension between the right and left wall faces 16b, and the level position of a bottom groove portion are accurately formed so that the axial misalignment of the optical waveguide 2 which is passed through falls within a range of several µm. The clearance between the optical waveguide 2 and the insertion hole 13b is set to be larger than that between the optical waveguide 2 and the rectangular groove 16a in the positioning portion 16.

According to the configuration, the easiness of insertion of the optical waveguide 2 into the insertion hole 13b is ensured, and at the same time the optical waveguide is accurately positioned to the axial center of the insertion hole 13b by the rectangular groove 16a of the positioning portion 16.

In the case of the embodiment, the ferrule 13 including the positioning portion 16 is a molded product of an epoxy resin or a PPS (polyphenylene sulfide) resin.

Next, the method of producing the optical waveguide connector 11 will be described with reference to FIG. 2.

As shown in FIG. 2(a), first, the optical waveguide 2 is inserted into the insertion hole 13b of the ferrule 13, and the tip end of the optical waveguide 2 is positioned in the rectangular groove 16a of the positioning portion 16. As indicated by the arrow in FIG. 2(b), next, a pressing and positioning step of pressing the optical waveguide 2 in the rectangular groove 16a against the bottom face of the rectangular groove 16a by the pressing member 19 is performed to set a state where the optical waveguide 2 is aligned with the axial center of the ferrule 13. As shown in FIG. 2(c), then, a bonding step of filling the insertion hole 13b with an adhesive agent 18 through the opening 13d of the ferrule 3 is performed. When the filled adhesive agent 18 is cured and the optical waveguide 2 is fixed to the insertion hole 13b, as shown in FIG. 2(d), a cutting step of removing the ferrule tip end including the positioning portion 16 by dicing is performed to obtain optical waveguide connector 11 shown in FIG. 2(e).

In the ferrule 13, the tip end portion including the tip end face 2a (see FIG. 1(d)) of the optical waveguide 3 may be subjected to an end face processing by a cutting process using a processing machine, such as cleavage or polishing, in place of dicing.

According to the production method, the positioning portion 16 is formed integrally with the ferrule 13, and therefore it is not necessary to perform the assembling step of, performed in the conventional step, assembling the positioning portion and the ferrule in a predetermined positional relationship, with using the positioning pins that are not shown.

The positioning portion 16 is configured as the rectangular groove 16a in which the two faces are opened, whereby, in the case where the positioning portion 16 and the ferrule 13 are integrally formed by injection molding, the positioning portion is enabled to be molded without using a core. Therefore, a single-piece product having an accurate positioning portion can be produced with a high yield. However, the positioning portion 16 may be formed as through hole in which only one face on the side of the ferrule tip end is opened, in place of the rectangular groove 16a in which the two faces are opened. According to the configuration, the pressing member 19 may be omitted.

According to the method of producing an optical waveguide connector shown in the first embodiment, the optical waveguide 2 is positioned to the axial center of the insertion hole 13b by the positioning portion 16 which is formed integrally with the tip end of the ferrule 13. In the insertion hole 13b of the ferrule 13, even when the dimensional tolerance is relaxed and the dimensions are set so as to leave a relatively large clearance in the periphery of the optical waveguide 2, therefore, the axial misalignment between the ferrule 13 and the optical waveguide 2 does not occur.

As described above, therefore, the clearance between the optical waveguide 2 and the insertion hole 13b of the ferrule 13 can be set to be larger than that between the rectangular groove 16a of the positioning portion 16 and the optical waveguide 2, and the easiness of insertion of the optical waveguide 2 can be ensured.

In the case where the positioning portion 16 is once accurately formed, when the aligning step and the bonding step are performed, the optical waveguide 2 which is passed through the insertion hole 13b of the ferrule member can be easily and surely positioned to the axial center of the insertion hole 13b, and the axial misalignment is prevented from occurring, whereby the optical waveguide connector 11 in which the connection loss due to the axial misalignment is suppressed to a low level can be obtained.

In the case of the embodiment, the ferrule 13 is formed by an epoxy resin or a PPS (polyphenylene sulfide) resin which is suitable to injection molding, and hence the production cost of the optical waveguide connector 11 can be reduced by mass production using injection molding.

FIG. 3(a) is a perspective view showing main portions of a second embodiment of the method of producing an optical waveguide connector according to the invention, and FIG. 3(b) is a view looking in the direction of C in FIG. 3(a).

According to the second embodiment, in the positioning portion 16 which is formed integrally with the ferrule tip end, inclined faces 27 which gradually narrow the groove width are formed on the both side faces on the tip end side of the rectangular groove 16a, respectively. Furthermore, chamfered portions 28 which are to butt against the inclined faces 27 to perform a function of positioning in the width direction are provided on the both sides of the tip end of the optical waveguide 2 that is guided into the rectangular groove 16a.

Moreover, guide faces 29 which are inclined continuously with the insertion hole 13b of the ferrule 13 to guide the optical waveguide 2 from the insertion hole 13b into the groove 16a are formed in edge portions of the inlet side of the groove 16a.

According to the production method, as shown in FIG. 3(b), the optical waveguide 2 which is inserted into the groove 16a of the positioning portion 16 is surely aligned in the width direction and can be correctly positioned without causing the axial misalignment, by engagement of the inclined faces 27 formed on the both side faces of the groove (16a) with the chamfered portions 28 formed on the optical waveguide 2.

Since the inclined guide faces 29 are disposed in the inlet of the groove (16a), the insertion operation in the case where the optical waveguide 2 is to be passed through the rectangular groove (16a) through the insertion hole 13b of the ferrule 13 can be smoothly performed.

In the optical waveguide connector 11 which is produced any one of the production methods described in the above-described embodiments, the optical waveguide 2 is accurately positioned in production to the axial center of the insertion hole 13b of the ferrule 13 by the positioning portion 16 which is formed integrally with the tip end of the ferrule 13, and axial misalignment can be suppressed to a low level. When the amount of misalignment between the axial center of the optical waveguide 2 and that of the insertion hole 13b of the ferrule 13 is suppressed to 10 μm or less, for example, it is possible to obtain excellent connection properties in which the connection loss due to axial misalignment is 0.3 dB or less.

Although the invention has been described in detail and with reference to the specific embodiments, it is obvious to those skilled in the art that various changes and modifications can be made without departing from the spirit and scope of the invention. The application is based on Japanese Patent Application (No. 2006-277893) filed Oct. 11, 2006, and its disclosure is incorporated herein by reference.

The invention claimed is:

1. A ferrule for receiving an optical waveguide having a substantially rectangular cross-section shape, the ferrule comprising:
    a first end and a second end opposite to the first end;
    an insertion opening to which the optical waveguide is inserted, the insertion opening being disposed on the first end; and
    a positioning portion which positions said optical waveguide to an axial center of said insertion opening, wherein:
    the positioning portion includes a groove having a rectangular cross-section shape,
    the groove has an inclined portion in which a width of the rectangular cross-section shape of the groove gradually decreases as the inclined portion approaches to the second end so that an end of the optical waveguide abuts to the inclined portion and the inclined portion restricts the optical waveguide not to protrude beyond the second end when inserted, and
    an end of the inclined portion is disposed on the second end.

2. The ferrule according to claim 1, wherein:
    a clearance between said optical waveguide which is passed through said insertion opening, and
    said insertion opening is larger than a clearance between said positioning portion and said optical waveguide.

3. A method of producing an optical waveguide connector in which the ferrule according to claim 1 is used, and an optical waveguide is inserted from said insertion opening of said ferrule, wherein said method comprises steps of:

restricting a position along an insertion direction of said optical waveguide inserted from said insertion opening, by pressing said optical waveguide against said positioning portion of said ferrule, to position said optical waveguide to the axial center of said insertion opening;

filling a gap between said positioning portion including the inclined portion and said optical waveguide which is aligned with said insertion opening, with an adhesive agent; and cutting off a ferrule tip end of the ferrule including said positioning portion in a state where said optical waveguide is fixed to said insertion opening by said filling step.

4. An optical waveguide connector, wherein said connector is produced by the method of producing an optical waveguide connector according to claim 3.

5. The ferrule according to claim 1, wherein:

the ferrule comprises a top face and a bottom face, each connecting the first end and second end, and the top face has a through opening, disposed over the positioning portion, for receiving an adhesive agent.

6. The ferrule according to claim 1, wherein only the width of the rectangular cross-section shape of the groove gradually decreases as the groove approaches to the second end.

7. The ferrule according to claim 1, wherein the groove has a bottom face and walls perpendicular to the bottom face.

8. The method of claim 3, wherein:

the ferrule comprises a top face and a bottom face, each connecting the first end and second end, the top face has a through opening disposed over the positioning portion, and the adhesive agent is filled via the through opening.

9. The method according to claim 3, wherein only the width of the rectangular cross-section shape of the groove gradually decreases as the groove approaches to the second end.

10. The method according to claim 3, wherein an end of the inclined portion and is disposed on the second end.

11. The method according to claim 3, wherein the groove has a bottom face and walls perpendicular to the bottom face.

* * * * *